(12) United States Patent
Shakudo et al.

(10) Patent No.: US 11,982,371 B2
(45) Date of Patent: May 14, 2024

(54) FLUID CONTROL VALVE AND FLUID CONTROL APPARATUS

(71) Applicant: HORIBA STEC, Co., Ltd., Kyoto (JP)

(72) Inventors: Kazuya Shakudo, Kyoto (JP); Yuya Kawai, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 0 days.

(21) Appl. No.: 18/053,627

(22) Filed: Nov. 8, 2022

(65) Prior Publication Data

US 2023/0160493 A1 May 25, 2023

(30) Foreign Application Priority Data

Nov. 25, 2021 (JP) .................. 2021-191109

(51) Int. Cl.
| | |
|---|---|
| *F16K 31/16* | (2006.01) |
| *F16K 11/04* | (2006.01) |
| *F16K 1/42* | (2006.01) |
| *F16K 1/52* | (2006.01) |
| *F16K 31/00* | (2006.01) |
| *F16K 31/02* | (2006.01) |
| *F16K 37/00* | (2006.01) |
| *F16K 41/10* | (2006.01) |
| *G01F 1/40* | (2006.01) |

(Continued)

(52) U.S. Cl.
CPC .............. *F16K 31/16* (2013.01); *F16K 11/04* (2013.01); *F16K 1/42* (2013.01); *F16K 1/52* (2013.01); *F16K 31/007* (2013.01); *F16K 31/02* (2013.01); *F16K 37/005* (2013.01); *F16K 41/10* (2013.01); *G01F 1/40* (2013.01); *G01F 1/6842* (2013.01); *G01F 1/6847* (2013.01); *G01F 5/00* (2013.01); *G01F 15/005* (2013.01); *G05D 7/0635* (2013.01)

(58) Field of Classification Search
CPC ........ F16K 31/16; F16K 31/007; F16K 31/02; F16K 11/04; F16K 37/005; F16K 1/52; F16K 1/42; F16K 41/10; G01F 1/6842; G01F 1/40; G01F 1/6847; G01F 5/00; G01F 15/005; G05D 7/0635
USPC ....................................................... 137/625.3
See application file for complete search history.

(56) References Cited

U.S. PATENT DOCUMENTS

| | | | |
|---|---|---|---|
| 8,844,901 B2 * | 9/2014 | Hayashi | ............... F16K 25/00 251/360 |
| 8,967,200 B2 * | 3/2015 | Hayashi | ............... F16K 1/34 137/625.33 |

(Continued)

FOREIGN PATENT DOCUMENTS

| | | |
|---|---|---|
| JP | 2021514042 A | 6/2021 |
| WO | 2019163926 A1 | 8/2019 |

*Primary Examiner* — Minh Q Le
(74) *Attorney, Agent, or Firm* — Alleman Hall & Tuttle LLP (57) ABSTRACT

The present invention is intended to improve the responsiveness while increasing a flow rate, and is an orifice having a valve seat surface, the orifice includes: a vertical channel that opens to valve seat surface and a facing surface that faces the valve seat surface; and a horizontal channel that opens to an outer circumferential surface between the valve seat surface and the facing surface, and that intersects with the vertical channel. The vertical channel is split into a plurality of channel branches from an intersection with the horizontal channel, with a space therebetween, on a side of the facing surface.

10 Claims, 10 Drawing Sheets

(51) Int. Cl.
　　　*G01F 1/684*　　　(2006.01)
　　　*G01F 5/00*　　　(2006.01)
　　　*G01F 15/00*　　　(2006.01)
　　　*G05D 7/06*　　　(2006.01)

(56) References Cited

U.S. PATENT DOCUMENTS

| | | | | |
|---|---|---|---|---|
| 9,328,826 | B2* | 5/2016 | Hayashi | G05D 7/0635 |
| 10,480,670 | B2* | 11/2019 | Hayashi | G05D 7/0629 |
| 10,852,752 | B2* | 12/2020 | Johnson | G05D 7/0635 |
| 11,680,646 | B2* | 6/2023 | Shakudo | F16K 1/36 |
| | | | | 251/333 |
| 2013/0048898 | A1* | 2/2013 | Hayashi | F16K 47/00 |
| | | | | 251/337 |
| 2014/0116538 | A1* | 5/2014 | Tanaka | G05D 7/0635 |
| | | | | 137/486 |
| 2014/0190578 | A1* | 7/2014 | Hayashi | F16K 1/42 |
| | | | | 137/486 |
| 2014/0290778 | A1* | 10/2014 | Yasuda | F16K 31/007 |
| | | | | 137/859 |
| 2017/0292622 | A1* | 10/2017 | Hayashi | G05D 7/0635 |
| 2020/0166150 | A1* | 5/2020 | Miyamoto | G05D 16/2013 |
| 2022/0163983 | A1* | 5/2022 | Shakudo | G05B 11/36 |

\* cited by examiner

FLUID CONTROL VALVE AND FLUID CONTROL APPARATUS

BACKGROUND

Technical Field

The present invention relates to a fluid control valve and a fluid control apparatus.

Related Art

As a conventional fluid control valve, there is a control valve used in a mass flow controller, such as that disclosed in JP 2021-514042 A. The control valve includes a valve cavity that has an inlet and an outlet, a poppet valve (valve body) that is disposed inside the valve cavity, that has a plurality of vertical channels, and the bottom surface of which faces the inlet, and an orifice that is disposed between the poppet valve and the outlet inside the valve cavity. The inlet is provided on the bottom surface of the valve cavity, and the outlet is provided on the inner circumferential surface of the valve cavity.

To achieve a high flow rate, the orifice has a plurality of vertical channels extending from the bottom surface (valve seat surface) to the top surface, and a plurality of horizontal channels opening to an outer circumference of the orifice. Each of the horizontal channels intersects with at least one of the vertical channels in the orifice. As the poppet valve moves away from the bottom surface (valve seat surface) of the orifice, the gas rises from the bottom surface of the orifice through the vertical channels, then horizontally advances through horizontal channels or along a surface channel provided on the top surface of the orifice, and flows out to the outlet.

However, in the above configuration, the gas risen through the vertical channels rarely flows into the horizontal channels, and tend to just cross the horizontal channels and to flow to the top surface of the orifice. This might cause a deterioration of responsiveness in the flow rate.

PRIOR ART DOCUMENT

Patent Document

Patent Document 1: JP 2021-514042 A

SUMMARY

Therefore, the present invention has been made in consideration of the problem described above, and a main object of the present invention is to improve the responsiveness in the flow rate, while increasing the flow rate.

Solution to Problem

In other words, a fluid control valve according to the present invention is characterized in including: an orifice having a valve seat surface; a valve body having a seating surface on which the valve seat surface is seated; a driving unit configured to drive the valve body; a channel block provided with a housing recess for housing the orifice and the valve body, wherein the orifice includes: a vertical channel that opens to the valve seat surface and to a facing surface facing the valve seat surface; and a horizontal channel that opens to an outer circumferential surface between the valve seat surface and the facing surface, and that intersects with the vertical channel, and the vertical channel is split into a plurality of branch channels with a space therebetween, on a side of the facing surface, from an intersection with the horizontal channel.

With such a fluid control valve, because the horizontal channel and the vertical channel are configured to intersect with each other, it is possible to increase the flow rate, compared with an example that uses only the vertical holes. In addition, because the vertical channel is split into a plurality of branch channels with a space therebetween, on the side of the facing surface, from the intersection with the horizontal channel, the inner wall surface defining the horizontal channel extends between the branch channels. As a result, the fluid risen along the vertical channels hits the inner wall surface of the horizontal channel, the inner wall extending between the branch channels, so that the fluid can flow into the horizontal channel more easily. Hence, the responsiveness of the flow rate can be improved. Therefore, according to the present invention, it is possible to improve the responsiveness of the flow rate, while increasing the flow rate. In addition, because the vertical channel is split into a plurality of branch channels from the intersection with the horizontal channel, the fluid flowing out from the facing surface can be distributed uniformly.

As a specific embodiment of the vertical channels, the vertical channel has two branch channels on the side of the facing surface with respect to the intersection, and the center axes of the two respective branch channels are not in line with the center axis of the horizontal channel, preferably. Specifically, in a plan view, two branch channels are arranged in a direction orthogonal to the central axis of the horizontal channel.

In order to increase the flow rate flowing into the vertical channel and to make it easier for the fluid to flow into the horizontal channel, the opening width of the vertical channel on the side of the valve seat with respect to the intersection is larger than the channel diameter of the horizontal channel, preferably.

In order to further increase the flow rate using the fluid control valve of the present invention, the vertical channel is provided in plurality, and the horizontal channel is provided in plurality, preferably.

In a configuration in which all of the vertical channels intersect with the horizontal channels, the number of the vertical channels is restricted by the number of the horizontal channels, so that it is not possible to achieve an even higher flow rate. In order to suitably solve this problem and to achieve a higher flow rate, at least one of the plurality of vertical channels intersects with none of the horizontal channels, preferably.

In order to allow the fluid passed through the vertical channels and flown out of the facing surface to merge with the fluid passed through the horizontal channel and flown out of the outer circumferential surface, the facing surface is preferably provided with a cutout that extends radially outwards from an opening of the vertical channel.

In the fluid control valve according to the present invention, the plunger provided to the driving unit for driving the valve body is inserted into the center of the orifice. As a specific embodiment of this configuration, the vertical channel may be provided in plurality along a circumferential direction, and a central channel opening to the valve seat surface and the facing surface may be provided at a center of the circumferential direction. In this configuration, a plunger is inserted into the central channel.

In this configuration, the diameter of the central channel preferably increases continuously from the side of the valve seat surface toward the side of the facing surface. With this configuration, a pressure loss of the fluid flowing through the central channel can be reduced, so that the flow rate can be increased further.

It is preferable that: an upstream channel is connected to a bottom surface of the housing recess, and a downstream channel is connected to an inner circumferential surface of the housing recess; and that an annular recess is provided on the inner circumferential surface of the housing recess correspondingly to an opening of the horizontal channel.

With this configuration, the annular recess formed on the inner circumferential surface of the housing recess can increase the size of the channel for the fluid flowing out of the horizontal channel, so that it becomes possible to reduce the pressure loss and to increase the flow rate.

A fluid control apparatus including the fluid control valve is also an aspect of the present invention. Specifically, the fluid control apparatus includes the fluid control valve, a flowmeter unit configured to measure a flow rate in the channel, and a control unit configured to control the fluid control valve based on a measurement collected by the flowmeter unit.

Advantageous Effects of Invention

According to the present invention described above, because the vertical channel branches off from the intersection with the horizontal channel at an interval on the facing surface side, it is possible to improve the responsiveness while increasing the flow rate.

DETAILED DESCRIPTION

A fluid control apparatus according to an embodiment of the present invention will now be explained with reference to some drawings. Note that, to facilitate understanding, all of the drawings described below are schematic representations, with some omissions and exaggerations made as appropriate. The same components are denoted by the same reference numerals, and the descriptions thereof will be omitted as appropriate.

Device Configuration

A fluid control apparatus 100 according to the present embodiment is what is called a mass flow controller, and is used in controlling a flow rate of gas supplied into a chamber where semiconductor manufacturing processing is performed, for example. The fluid control apparatus 100 may control not only gas but also liquid.

Figure 1:
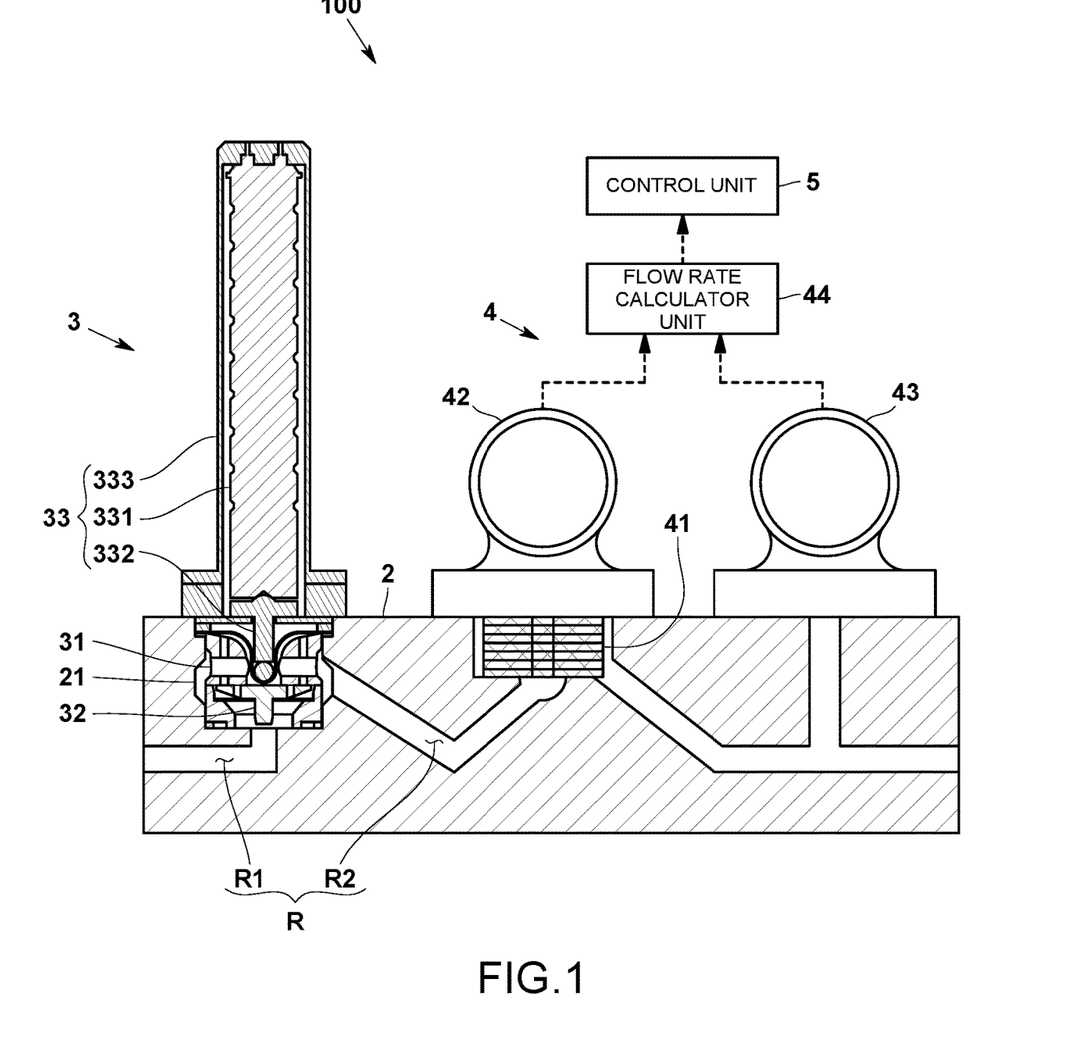
FIG. 1 is a cross-sectional view schematically illustrating a configuration of a fluid control apparatus according to one embodiment of the present invention.

Specifically, as illustrated in FIG. 1, the fluid control apparatus 100 includes a channel block 2 internal of which is provided with a channel R, a fluid control valve 3 for controlling the gas inside the channel R, a flowmeter unit 4 for measuring the flow rate in the channel R, and a control unit 5 for controlling the fluid control valve 3 based on the measurement collected by the flowmeter unit 4.

The channel block 2 is provided with a housing recess 21 where the fluid control valve 3 is installed. The housing recess 21 is provided on one surface (top surface in FIG. 1) of the channel block 2. An upstream channel R1 is connected to the bottom surface of the housing recess 21, and a downstream channel R2 is connected to the inner circumferential surface of the housing recess 21. In other words, the channel R provided inside the channel block 2 is divided into the upstream channel R1 and the downstream channel R2 by the housing recess 21.

A gas entry port (not illustrated) is provided on an upstream end of the upstream channel R1, and a gas discharge port (not illustrated) is provided on a downstream end of the downstream channel R2.

The fluid control valve 3 is what is called a normally-closed piezoelectric valve, and the degree by which the fluid control valve 3 is opened is controlled by a voltage applied thereto. The fluid control valve 3 may be what is called a normally-opened piezoelectric valve.

Figure 2:
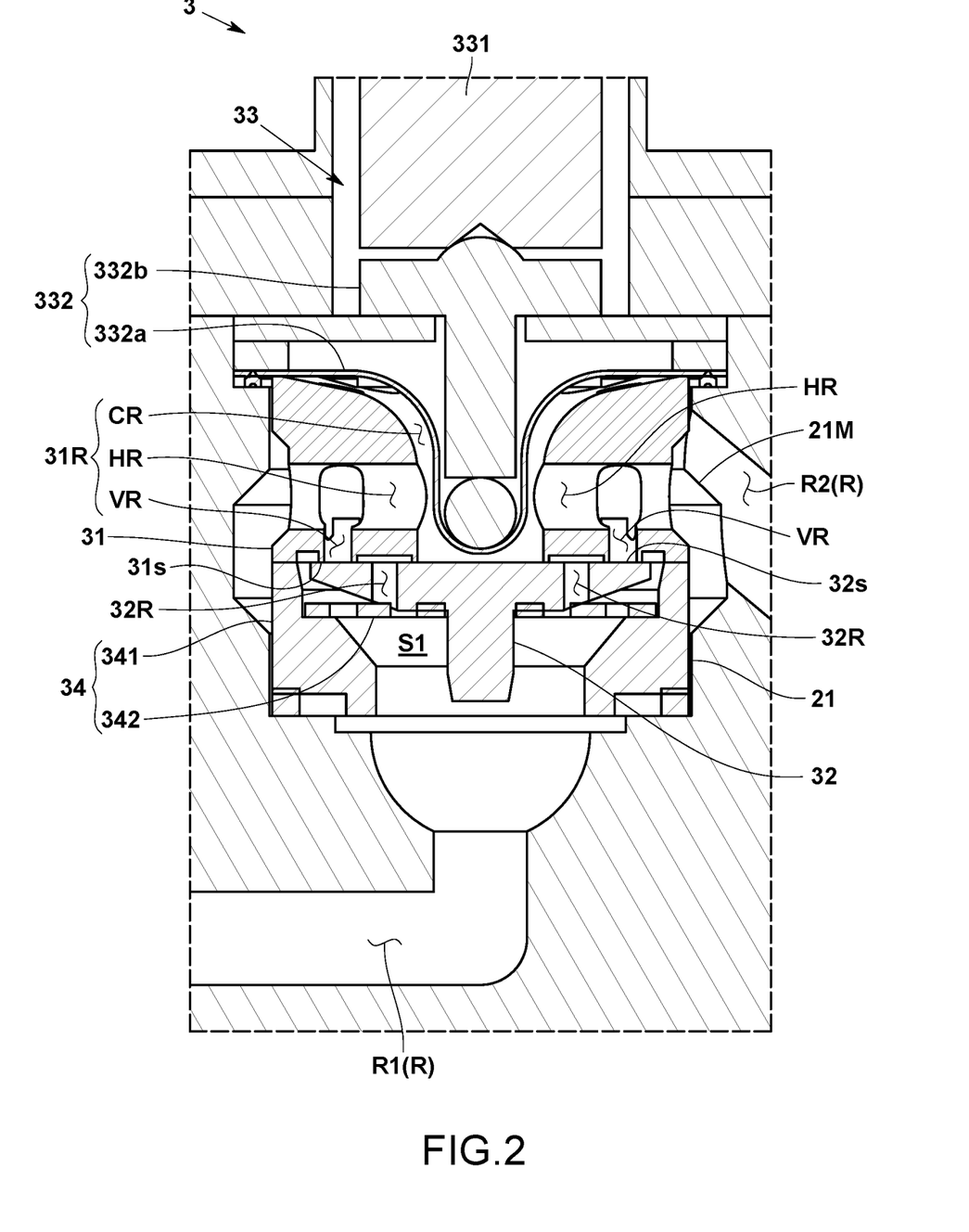
FIG. 2 is a partially enlarged cross-sectional view illustrating an orifice and a valve body included in a fluid control valve according to the embodiment.

Specifically, as illustrated in FIGS. 1 and 2, the fluid control valve 3 includes an orifice (valve seat member) 31 having a valve seat surface 31s, a valve body 32 having a seating surface 32s seated on the valve seat surface 31s, and a driving unit 33 that drives the valve body 32.

The orifice 31 is housed in the housing recess 21. At this time, the orifice 31 is housed in the housing recess 21 in such a manner that the valve seat surface 31s faces the bottom surface of the housing recess 21. In the orifice 31, an inlet is provided to the valve seat surface 31s, and an internal channel 31R communicating with the inlet is also provided. The orifice 31 will be explained later in detail.

The valve body 32 is provided movably inside the housing recess 21. Inside the housing recess 21, the valve body 32 is provided between the valve seat surface 31s of the orifice 31 and the bottom surface of the housing recess 21.

Specifically, the valve body 32 has the seating surface 32s on the top surface, and an outlet as well as an internal channel 32R communicating with the outlet are provided on the seating surface 32s. The outlet on the seating surface 32s and the inlet on the valve seat surface 31s are formed at positions not overlapping each other when the seating surface 32s is seated on the valve seat surface 31s.

Inside the housing recess 21, the valve body 32 is supported movably by the support member 34. The support member 34 includes a support base 341 having an annular shape and housed inside the housing recess 21, and an elastic body 342, such as a leaf spring, provided inside the support base 341 to support the valve body 32. As a result, the valve body 32 is supported by the elastic body 342, inside the support base 341. Note that both of the support base 341 and the elastic body 342 are configured to permit a gas flow. In addition, the bottom surface of the orifice 31 is in close contact with the annular-shaped top surface of the support base 341, together forming a valve chamber 51 where the valve body 32 is housed, and that communicates with the upstream channel R1.

The driving unit 33 includes, for example, a piezoelectric stack 331 formed by stacking a plurality of piezoelectric elements, and a plunger mechanism 332 that becomes displaced by extension of the piezoelectric stack 331.

The piezoelectric stack 331 is housed inside a casing 333, and has an end connected to the plunger mechanism 332. The plunger mechanism 332 according to the present embodiment includes a diaphragm member 332a, and a pressing member 332b that presses the top surface of the valve body 32 with the diaphragm member 332a therebetween. The plunger mechanism 332 is inserted into the central channel CR of the orifice 31, and is brought into contact with the top surface of the valve body 32.

When a predetermined voltage is applied to the piezoelectric stack 331, the piezoelectric stack 331 is caused to extend, and the plunger mechanism 332 applies a biasing force to the valve body 32 in the direction in which the valve opens, and the valve seat surface 31s becomes separated from the seating surface 32s by a distance corresponding to the applied voltage, and becomes opened. The upstream channel R1 and the downstream channel R2 come to communicate with each other via this gap. During the normal condition without any application of the voltage to the piezoelectric stack 331, the valve body 32 is kept closed by the elastic force of the elastic body 342 of the support member 34.

The flowmeter unit 4 is a flowmeter of a type that uses pressure, and includes a laminar flow element 41 provided in the channel R, a first pressure sensor 42 provided so as to be able to measure the pressure on the upstream side of the laminar flow element 41, a second pressure sensor 43 provided so as to be able to measure the pressure on the downstream side of the laminar flow element 41, and a flow rate calculator unit 44 that calculates the flow rate of the fluid flowing through the channel R based on the first pressure and the second pressure measured by the first pressure sensor 42 and the second pressure sensor 43, respectively. The flowmeter unit 4 is provided either upstream or downstream of the fluid control valve 3 in the channel R. As a fluid resistance 41, a sonic nozzle or the like may be used, instead of the laminar flow element.

The control unit 5 controls the fluid control valve 3 based on the flow rate measurement collected by the flowmeter unit 4. The control unit 5 is a computer including a CPU, a memory, an A/D converter, a D/A converter, and various input/output units, and controls the fluid control valve 3 by executing a fluid control program stored in the memory, and causing the CPU and peripheral devices to cooperate with one another.

The control unit 5 controls the degree by which the fluid control valve 3 is opened, based on a command flow rate input from outside, and on the flow rate measurement collected by the flowmeter unit 4. Specifically, the control unit 5 controls the degree by which the fluid control valve 3 is opened so that a deviation between the command flow rate and the flow rate measurement is reduced. The control unit 5 according to the present embodiment performs PID calculation on the deviation between the command flow rate and the flow rate measurement, and outputs a command voltage corresponding to the result to the driving circuit of the driving unit 33. The driving circuit applies a voltage corresponding to the input command voltage to the piezoelectric stack 331.

Specific Configuration of Orifice 31

The orifice 31 according to the present embodiment has a configuration for increasing the flow rate and improving the responsiveness of the flow rate.

Specifically, as illustrated in FIGS. 2 to 9, the orifice 31 has a substantially disk-like shape, and includes, as the internal channel 31R, a plurality of vertical channels VR (VR1, VR2) opening to the valve seat surface 31s and to a facing surface 31t facing the valve seat surface 31s, and a plurality of horizontal channel HR opening to the outer circumferential surface 310 that extends between the valve seat surface 31s and the facing surface 31t, and intersecting with the vertical channels VR.

Figure 6:
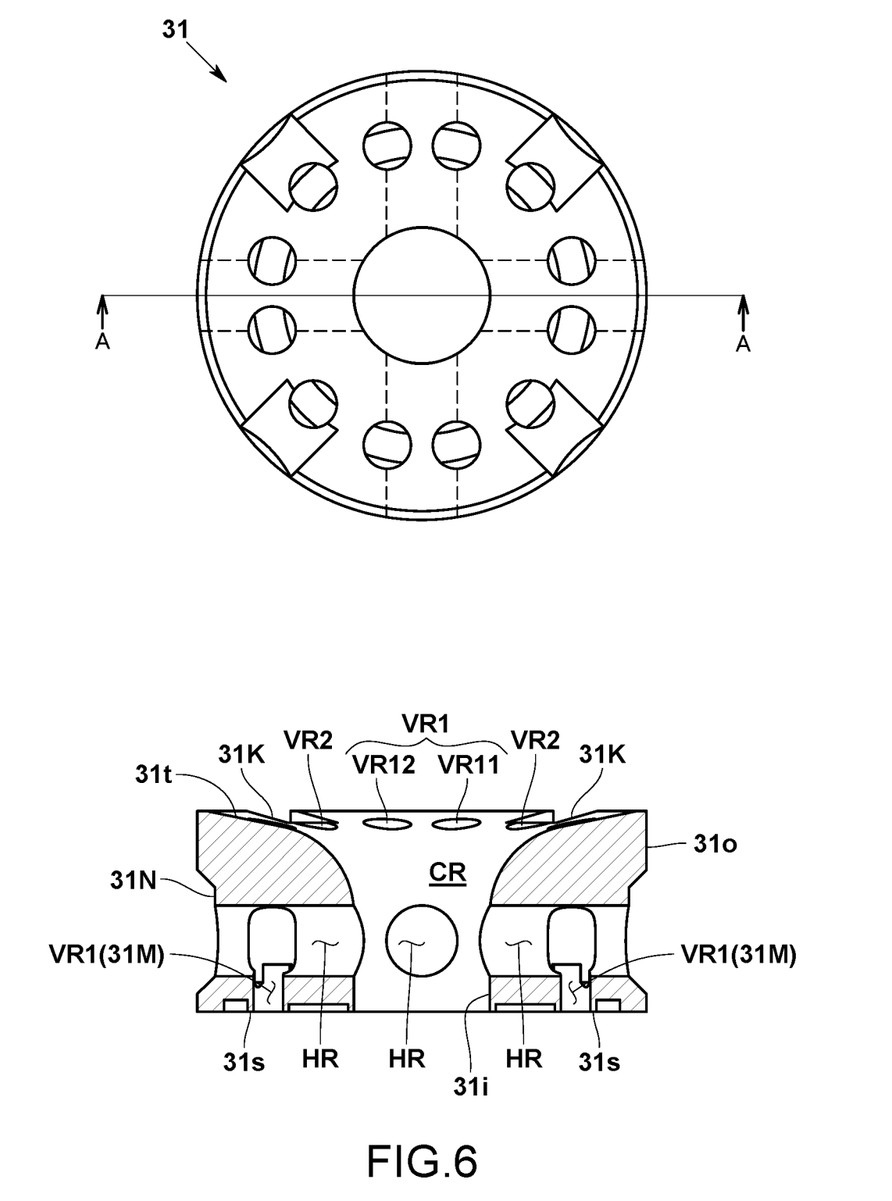
FIG. 6 is a plan view of and a cross-sectional view across the line A-A in the orifice according to the embodiment.
Figure 7:
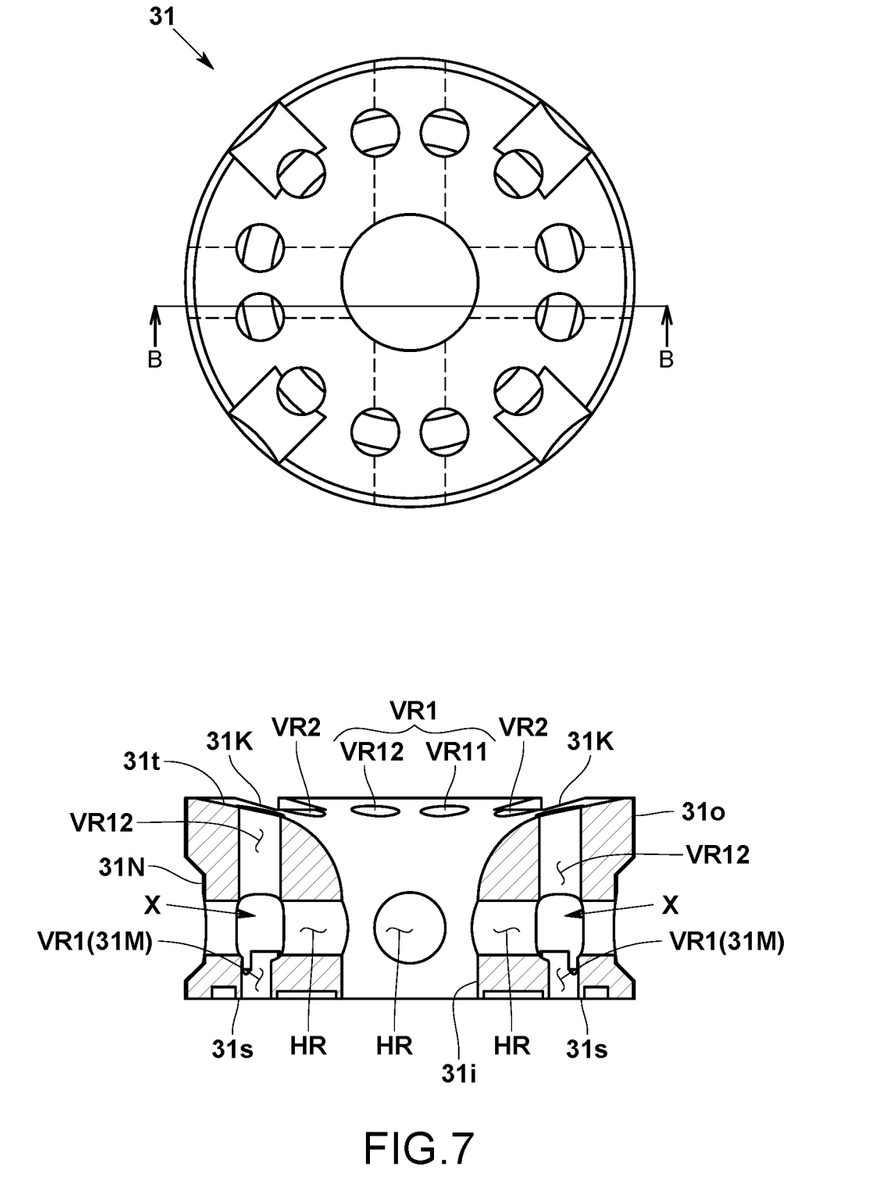
FIG. 7 is a plan view of and a cross-sectional view across the line B-B in the orifice according to the embodiment.
Figure 8:
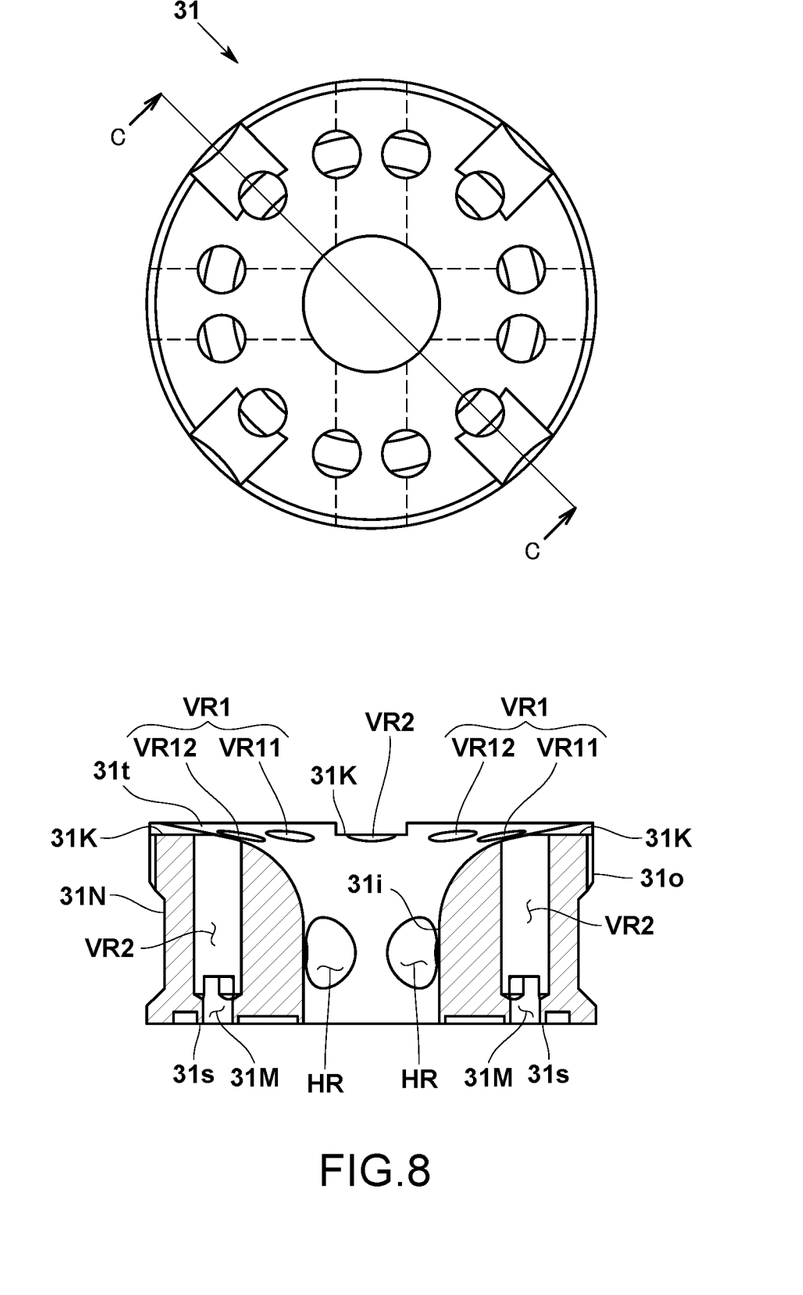
FIG. 8 is a plan view of and a cross-sectional view across the line C-C in the orifice according to the embodiment.

In the orifice 31 according to the present embodiment, a plurality of vertical channels VR (VR1, VR2) are arranged in a circumferential direction (see FIGS. 3 and 4), and the central channel CR opening to the valve seat surface 31s and to the facing surface 31t is provided at the center of the circumferential direction (see FIGS. 6 to 8, for example). The central channel CR is a channel through which the plunger mechanism 332 included in the driving unit 33 is inserted (see FIG. 2). The central channel CR has a diameter increasing continuously from the side of the valve seat surface 31s toward the facing surface 31t. With this configuration, the pressure loss of the gas flowing through the central channel CR can be reduced, so that the flow rate can be increased.

As illustrated in FIGS. 3 and 6 to 8, the horizontal channel HR open to the outer circumferential surface 310 of the orifice 31, and also open to the inner circumferential surface 31i delineating the central channel CR. In the present embodiment, four horizontal channel HR are provided radially (see FIGS. 4 and 5). Each of the horizontal channels HR has a linear shape, and a channel cross-section shape thereof is circular (see FIG. 6, for example).

Figure 3:
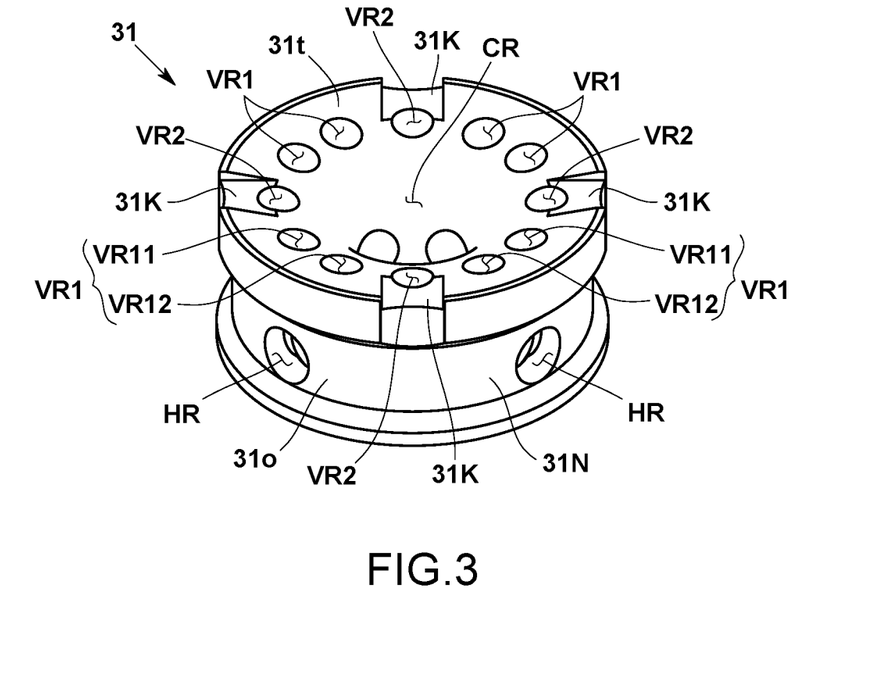
FIG. 3 is a perspective view of an orifice according to the embodiment.
Figure 4:
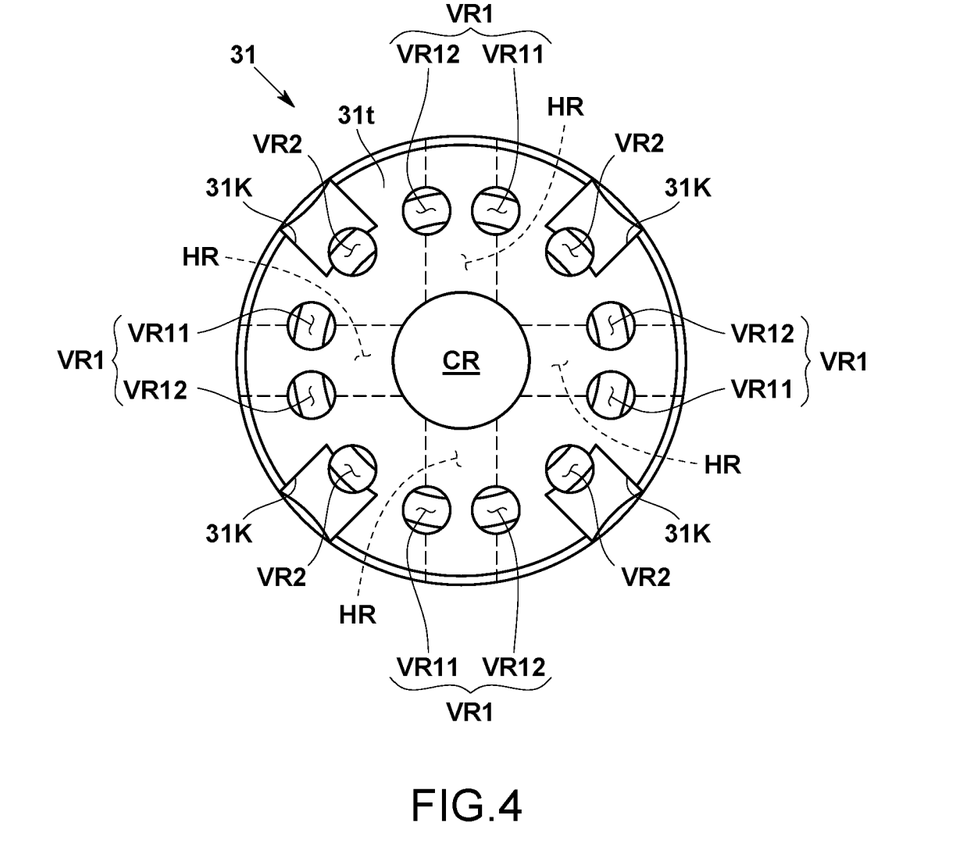
FIG. 4 is a plan view of the orifice according to the embodiment.
Figure 5:
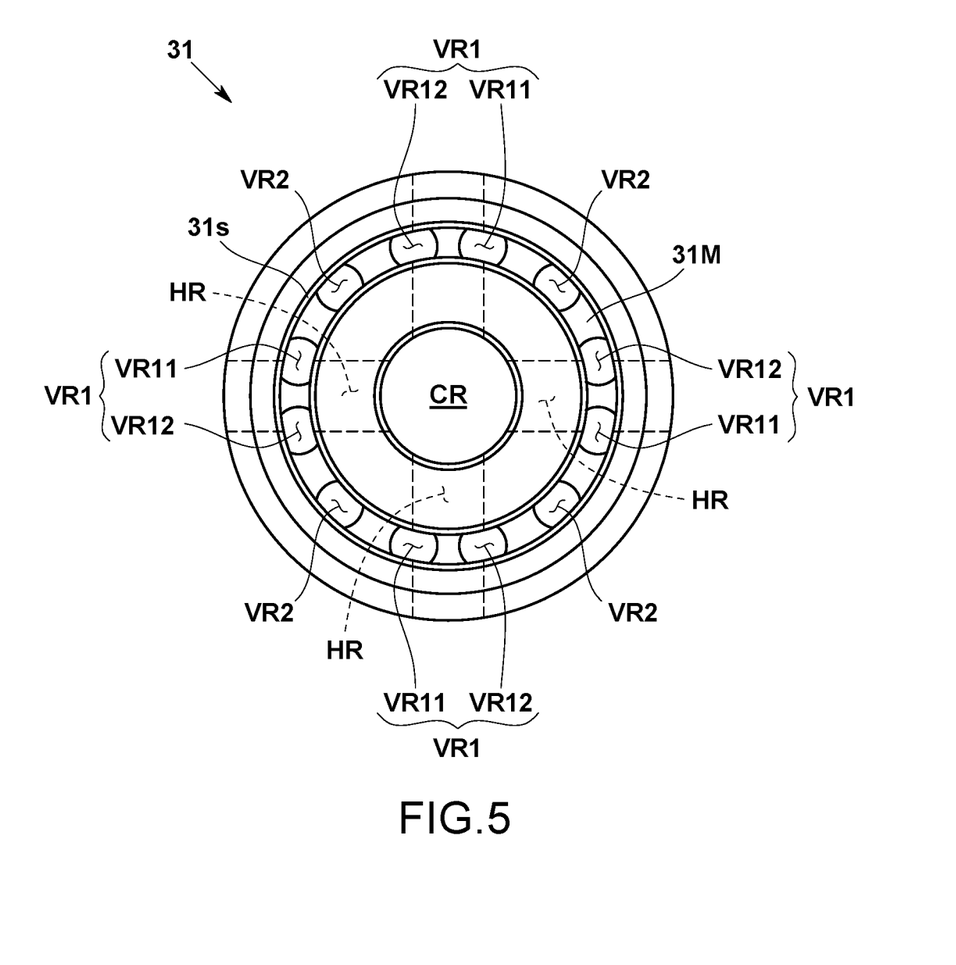
FIG. 5 is a bottom view of the orifice according to the embodiment.

As illustrated in FIGS. 3 to 5, for example, the vertical channels VR include first vertical channels VR1 that intersect with and communicate with the horizontal channels HR, and second vertical channels VR2 not intersecting with the horizontal channel HR. The second vertical channels VR2 are channels that are formed between the adjacent horizontal channel HR, and are not split into branch channels (see FIG. 8).

Figure 9:
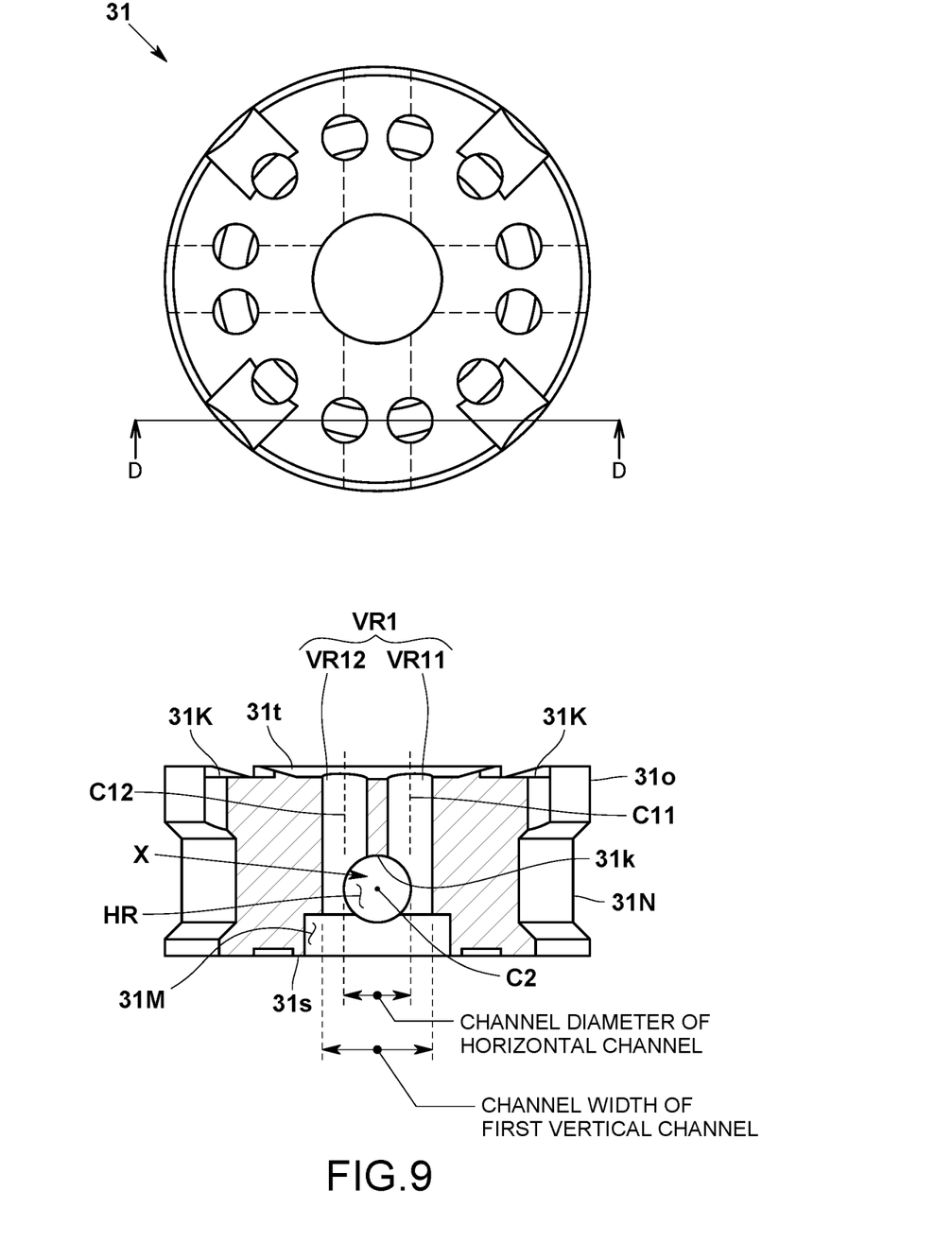
FIG. 9 is a plan view of and a cross-sectional view across the line D-D in the orifice according to the embodiment.

Specifically, as illustrated in FIG. 9, each of the first vertical channels VR1 is split on the side of the facing surface 31t, into two branch channels VR11 and VR12 with a space therebetween, from an intersection X with the horizontal channel HR. In other words, the first vertical channel VR1 is one channel on the side of the valve seat surface 31s with respect to the intersection X with the horizontal channel HR, and includes two channels on the side of the facing surface 31t with respect to the intersection X with the horizontal channel HR.

The central axes C11 and C12 of the respective two branch channels VR11 and VR12 are not in line with the central axis C2 of the horizontal channel HR. In other words, in a plan view, the two branch channels VR11, VR12 are arranged side by side in a direction orthogonal to the central axis C2 of the horizontal channel HR. The central axes C11 and C12 of the two respective branch channels VR11 and VR12 extend in parallel with each other. With this configuration, an inner wall surface 31k, which defines the horizontal channel HR, extends between the two branch channels VR11 and VR12, and this inner wall surface 31k is configured to provide a partition between the two branch channels VR11 and VR12. Furthermore, by splitting each of the vertical channels VR1 into branches, the mechanical strength of the orifice 31 can be ensured.

Furthermore, the opening width (channel width) of the first vertical channel VR1 on the side of the valve seat surface 31s with respect to the intersection X is configured to be larger than the channel diameter of the horizontal channel HR (see FIG. 9). With this configuration, the flow rate of the gas flowing into the first vertical channel VR1 is increased so that the gas easily flows into the horizontal channel HR. The opening width (channel width) represents, on the side of the valve seat surface 31s, the distance between the farthest points on the inner wall surfaces of the two branch channels VR11 and VR12, respectively.

In the present embodiment, as illustrated in FIG. 5, an annular groove 31M is provided, on the valve seat surface 31s of the orifice 31, in a manner following the vertical channels VR (VR1, VR2) that are arranged along the circumferential direction. The annular groove 31M allows the vertical channels VR (VR1, VR2) to communicate with one another, and the annular groove 31M serves as a part of the vertical channels VR (VR1, VR2). In other words, the opening of the annular groove 31M on the side of the valve seat surface 31s serves as the inlet formed on the valve seat surface 31s. With this configuration, the size of the inlet of the internal channel 31R, the inlet being provided on the valve seat surface 31s, is increased so that it becomes possible to achieve a high flow rate.

As illustrated in FIGS. 3 and 4, for example, the facing surface 31t of the orifice 31 is provided with cutouts 31K extending radially outwards from the openings of the respective vertical channels VR. In the present embodiment, these cutouts 31K are provided correspondingly to the openings of the second vertical channels VR2 that do not intersect with the horizontal channel HR. Through these cutouts 31K, the gas flowing through the vertical channels VR and the central channel CR, and flowing out of the facing surface 31t flows into the side of the outer circumferential surface 31o of the orifice 31, and flows into the downstream channel R2 that is connected to the inner circumferential surface of the housing recess 21. The cutouts 31K make it easy for the gas having flown through the first and second vertical channels VR1 and VR2 and out from the facing surface 31t to become merged with the gas having flown through the horizontal channels HR and out from the outer circumferential surface 31o.

At this time, as illustrated in FIG. 2, an annular recess 21M is provided on the inner circumferential surface of the housing recess 21 correspondingly to the openings of the horizontal channels HR. With this configuration, the annular recess 21M provided on the inner circumferential surface of the housing recess 21 can increase the size of the channel for the gas flowing out of the horizontal channels HR, so that it becomes possible to increase the flow rate by reducing the pressure loss. In addition, as illustrated in FIG. 3, for example, a recess 31N is also provided across the entire outer circumferential surface 31o of the orifice 31. The cutouts 31K communicate with the recess 31N. The horizontal channels HR open onto the bottom surface of the recess 31N. The recess 31N further increases the size of the channel between annular recess 21M of the housing recess 21 and the annular groove 31M, so that it becomes possible to increase the flow rate by reducing the pressure loss.

One example of a method of manufacturing the orifice 31 will now be explained.

To begin with, the central channel CR is formed, by machining such as cutting, at the center of the disk-shaped base material. The horizontal channels HR are also formed, by machining such as cutting, in a manner opening to the outer circumferential surface 31o of the base material, and to the inner circumferential surface 31i of the central channel CR.

The annular groove 31M is then formed, by machining such as cutting, on the surface that is to be the valve seat surface 31s of the base material. At this time, the depth of the annular groove 31M is set to a depth communicating with the horizontal channel HR. The annular groove 31M provides a part of the first vertical channels VR1 and the second vertical channels VR2.

The two branch channels VR11 and VR12 of the first vertical channels VR1 are then formed by machining such as cutting, on both sides of the central axis C2 of the horizontal channel HR, from the surface to be the facing surface 31t of the base material. The branch channels VR11 and VR12 are formed in a manner communicating with the horizontal channels HR.

The second vertical channels VR2 are also formed by machining such as cutting, at positions not intersecting with the horizontal channels HR, from the surface to be the facing surface 31t of the base material. The second vertical channels VR2 are formed in a manner communicating with the annular groove 31M. The other structures of the orifice 31 described above are also formed by machining such as cutting. The orifice 31 is manufactured in the manner described above.

Advantageous Effects of Present Embodiment

In the fluid control apparatus 100 configured as described above, because the horizontal channels HR intersect with the first vertical channels VR1, it is possible to increase the flow rate. In addition, because each of the vertical channels VR is split into branch channels with a space therebetween, from the intersection X with the horizontal channel HR, on the side of the facing surface 31t, the inner wall surface 31k defining the horizontal channel HR extends between the branch channels VR11 and VR12. As a result, the gas risen through the first vertical channel VR1 hits the inner wall surface 31k defining the horizontal channel HR and extending between the branch channels VR11 and VR12, so that the gas can flow into the horizontal channel HR more easily, and therefore, the responsiveness of the flow rate can be improved. In addition, it is also possible to increase the flow rate by increasing the size of the inlets of the first vertical channels VR1. Therefore, according to the present embodiment, the responsiveness of the flow rate can be improved while increasing the flow rate. In addition, because each of the vertical channels VR is split into branch channels from the intersection X with the horizontal channel HR, the gas flowing out from the facing surface 31t can be distributed uniformly. In particular, in the present embodiment, because the outlets of the two branch channels VR11 and VR12 of each of the first vertical channels VR1, and the outlets of the second vertical channels VR2 are arranged along the circumferential direction, the gas flowing out of the facing surface 31t can be distributed more uniformly.

Other Embodiments

For example, while some of the vertical channels VR do not intersect with the horizontal channels HR in the above embodiment, all the vertical channels VR may be configured to intersect with the horizontal channels HR.

Furthermore, in the above embodiment, every one of the vertical channels VR intersecting with the horizontal channel HR is split into branch channels from the intersection X, but it is possible to configure some of the vertical channels VR intersecting with the horizontal channel HR not split into branch channels from the intersection X.

Furthermore, the number of the horizontal channels HR is not limited to that according to the embodiment described above, and may also be any one of one to three or five or more.

In addition, the orifice 31 according to the embodiment described above is an example in which the inlets are provided along one circumferential direction, but it is also possible for the inlets to be provided along a plurality of circumferential directions that are concentrically arranged.

Figure 10:
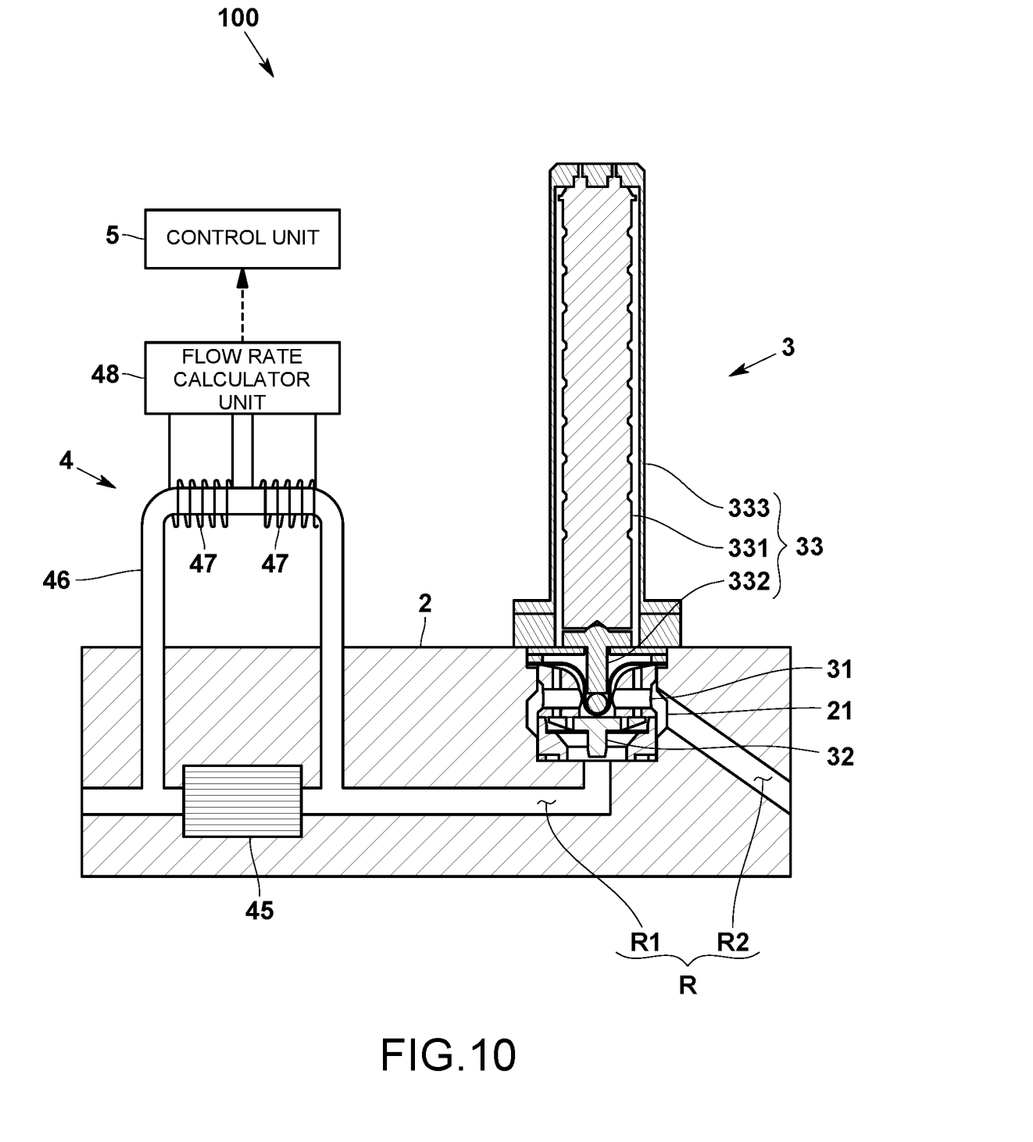
FIG. 10 is a schematic diagram illustrating a configuration of a fluid control apparatus according to a modification of the embodiment.

The flowmeter unit 4 according to the embodiment described above is of a pressure-based flowmeter, but may also be a thermal flowmeter. Specifically, as illustrated in FIG. 10, the thermal flowmeter unit 4 includes a shunt element (resistance element) 45 provided to the channel R, a narrow tube 46 that is branched from the channel R on an upstream side of the shunt element 45 and that is merged to the channel R on a downstream side of the shunt element 45, two electric heating coils 47 that are wound around the narrow tube 46 and that are kept at a constant temperature, by receiving applications of voltages, respectively, and a flow rate calculator unit 48 that detects a difference between the voltages applied to the respective electric heating coils 47 and that calculates a flow rate of the gas flowing through the channel R. The flowmeter unit 4 is provided either upstream or downstream of the fluid control valve 3 in the channel R. Note that the principle of flow rate measurement in the flowmeter unit is not limited to that described above, and any method may be used.

In addition, various modifications and combinations of the embodiments may be made within the scope not deviating from the gist of the present invention.

DESCRIPTION OF REFERENCE CHARACTERS

100 fluid control apparatus
2 channel block
21 housing recess
R1 upstream channel
R2 downstream channel
21M annular recess
3 fluid control valve
31 orifice
31s valve seat surface
31t facing surface
CR central channel
VR vertical channel
VR1 first vertical channel
VR2 second vertical channel
HR horizontal channel
X intersection
VR11 branch channel
VR12 branch channel
C11 center axis of branch channel
C12 center axis of branch channel
C2 central axis of horizontal channel
31K cutout
32s seating surface
32 valve body
33 driving unit

What is claimed is:

1. A fluid control valve comprising:
an orifice having a valve seat surface;
a valve body having a seating surface seated on the valve seat surface;
a driving unit configured to drive the valve body;
a channel block provided with a housing recess for housing the orifice and the valve body, wherein
the orifice includes:
a vertical channel that opens to the valve seat surface and to a facing surface facing the valve seat surface; and
a horizontal channel that opens to an outer circumferential surface between the valve seat surface and the facing surface, and intersects with the vertical channel,
the vertical channel is split into a plurality of branch channels with a space therebetween, on a side of the facing surface, from an intersection with the horizontal channel, and
central axes of the plurality of branch channels are included in the vertical channel before intersecting with the horizontal channel.

2. The fluid control valve according to claim 1, wherein the vertical channel has two branch channels on the side of the facing surface with respect to the intersection, and
central axes of the two respective branch channels are not in line with a central axis of the horizontal channel.

3. The fluid control valve according to claim 1, wherein an opening width of the vertical channel on a side of the valve seat surface with respect to the intersection is larger than a channel diameter of the horizontal channel.

4. The fluid control valve according to claim 1, wherein the vertical channel is provided in plurality, and
the horizontal channel is provided in plurality.

5. The fluid control valve according to claim 4, wherein at least one of the plurality of vertical channels intersects with none of the horizontal channels.

6. The fluid control valve according to claim 1, wherein the facing surface is provided with a cutout that extends radially outwards from an opening of the vertical channel.

7. The fluid control valve according to claim 1, wherein the vertical channel is provided in plurality along a circumferential direction, and a central channel opening to the valve seat surface and the facing surface is provided at a center of the circumferential direction, and
a diameter of the central channel increases continuously from a side of the valve seat surface toward a side of the facing surface.

8. The fluid control valve according to claim 1, wherein an upstream channel is connected to a bottom surface of the housing recess, and a downstream channel is connected to an inner circumferential surface of the housing recess, and
an annular recess is provided on the inner circumferential surface of the housing recess correspondingly to an opening of the horizontal channel.

9. A fluid control apparatus comprising:
the fluid control valve according to claim 1;
a flowmeter unit configured to measure a flow rate in a channel; and
a control unit configured to control the fluid control valve based on a measurement collected by the flowmeter unit.

10. A fluid control valve comprising:
an orifice having a valve seat surface;
a valve body having a seating surface seated on the valve seat surface;
a driving unit configured to drive the valve body;

a channel block provided with a housing recess for housing the orifice and the valve body, wherein the orifice includes:

a vertical channel that opens to the valve seat surface and to a facing surface facing the valve seat surface; and a horizontal channel that opens to an outer circumferential surface between the valve seat surface and the facing surface, and intersects with the vertical channel, the vertical channel is split into a plurality of branch channels with a space therebetween, on a side of the facing surface, from an intersection with the horizontal channel, the vertical channel is provided in plurality along a circumferential direction, and a central channel opening to the valve seat surface and the facing surface is provided at a center of the circumferential direction, and a diameter of the central channel increases continuously from a side of the valve seat surface toward a side of the facing surface.

* * * * *